Figure 1:
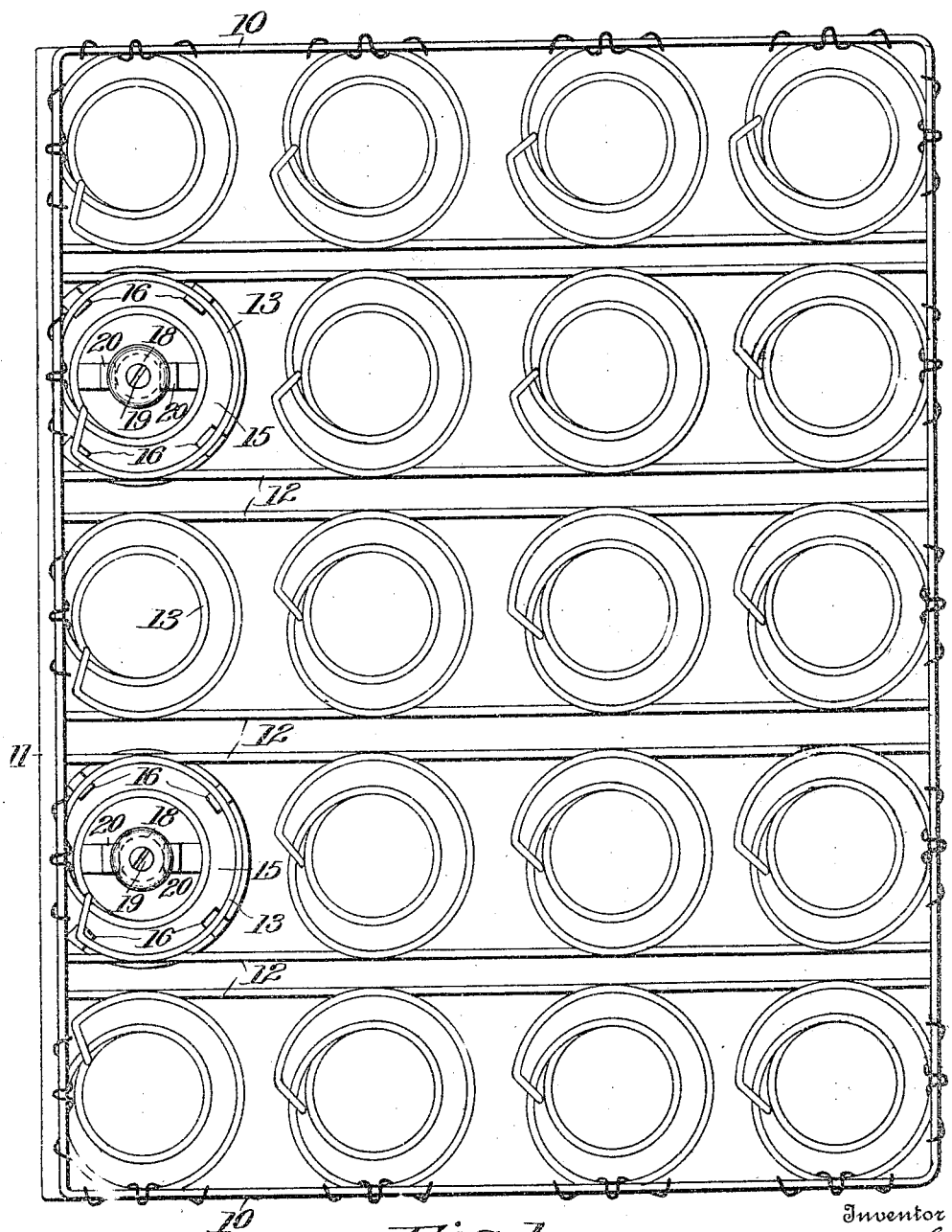

W. R. SMITH.
SEAT CUSHION RETAINER.
APPLICATION FILED JULY 2, 1913.
1,075,165.
Patented Oct. 7, 1913.
2 SHEETS—SHEET 2.
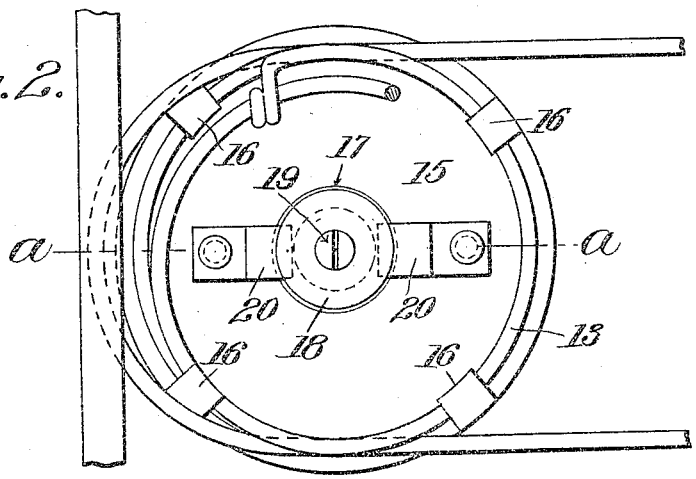
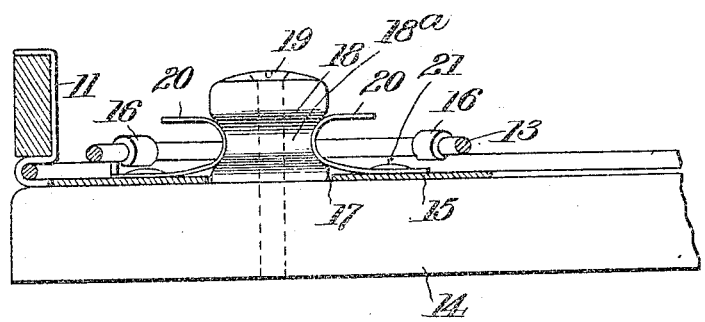
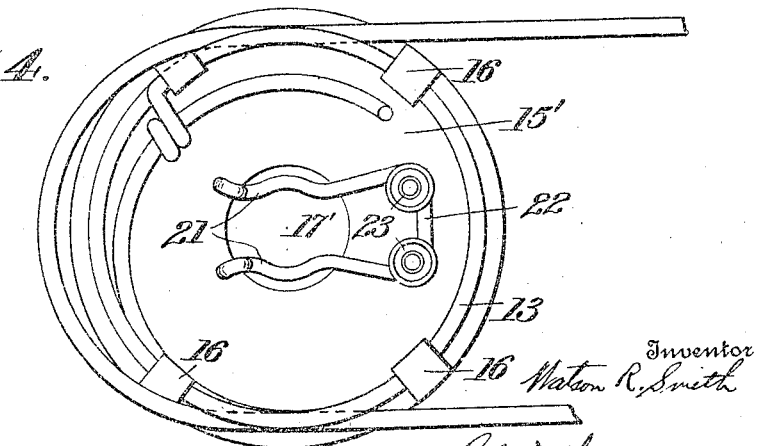
Witnesses
Inventor
Watson R. Smith
By
Attorney

UNITED STATES PATENT OFFICE.

WATSON R. SMITH, OF JACKSON, MICHIGAN.

SEAT-CUSHION RETAINER.

1,075,165.

Specification of Letters Patent.

Patented Oct. 7, 1913.

Application filed July 2, 1913. Serial No. 777,987.

*To all whom it may concern:*

Be it known that I, WATSON R. SMITH, a citizen of the United States, residing at Jackson, in the county of Jackson and State of Michigan, have invented certain new and useful Improvements in Seat-Cushion Retainers, of which the following is a specification.

This invention relates to seat retainers. The seats in vehicles, particularly in automobiles, wagons and carriages, are constantly sliding off of their support and to prevent this, in some instances, a molding or metal strip is nailed or otherwise secured across the front of the support upon which the cushion is mounted, rising up a little above the base of the cushion so as to hold the cushion from sliding forwardly off of its support.

The object of the present invention resides in the provision of a seat retainer for automobile or other spring cushions embodying among other characteristics means whereby the cushion is effectively secured on its support against danger of sliding movement and yet readily removable from its support, if desired.

Another object is to provide means for detachably securing the cushion to its support and holding the cushion against sliding movement off of the support without necessarily employing the present type of molding or metal strip usually secured across the support immediately in front of the cushion.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the scope or sacrificing any of the advantages of the invention.

In the drawings:—Figure 1 is a top plan view of the invention; Fig. 2 is an enlarged fragmentary top plan view of one of the retainers; Fig. 3 is a transverse sectional view along the line *a—a* of Fig. 2; and Fig. 4 is a top plan view of a modified form of retainer.

Referring now to the accompanying drawings, and more particularly to Figs. 1 to 3, inclusive, the reference characters 10 and 11 indicate upper and lower frames of any suitable character, between which frames, and mounted upon suitable supporting wires 12 are rows of springs 13 extending from the front to the rear of the structure. These frames, the supporting means and the springs may be coupled together and be arranged in any suitable manner, and in fact, if desired, the upper frame may be entirely eliminated.

The spring cushion thus described is adapted to rest upon a suitable support 14, in an automobile or other vehicle, generally arranged at the proper elevation above the floor of the vehicle to properly support the cushion. Where the cushion is of such length as to occupy the width of the automobile or other vehicle body as is usual in the rear seat of automobiles, carriages and the like, two of the front springs 13 are provided with plates 15, having fingers 16 adapted to embrace the lower convolutions of the corresponding springs 13 so that the plates 15 may be carried by the cushion. Each plate is preferably annular and preferably formed of sheet metal and provided with a central opening 17 adapted to receive buttons 18 fastened by means of suitable screws 19, or otherwise, on the support 14. These buttons 18 may be rotatable or held against rotation by the fastenings 19 and each is provided preferably with a neck 18ª. By virtue of the buttons 18 projecting through the central aperture 17 in the plates 15, the spring structure or cushion is held against forward movement off of its supporting means under ordinary conditions, but to prevent any sliding play at all of the cushion and to obviate any possibility of the cushion being lifted upwardly, thereby withdrawing the buttons from the apertured plates 15, there is preferably carried by each plate the oppositely disposed spring arms 20 riveted as at 21 or otherwise secured in any suitable manner to the plates 15 within the lower convolutions of the springs. The pairs of spring arms 20 on each plate 15 are yieldable and each spring arm preferably terminates short of its companion spring arm. The pairs of spring arms extend over and above the central apertures of the corresponding plates. The result is that when the front edge of the cushion is let down on the support 14 the buttons 18 pass through the apertures 17 of the plates 15, forcing the pairs of yieldable spring arms 20 to spread outwardly until the spring arms are opposite the necks 18ª of the buttons, when said arms spring into the necks of the buttons and thereby hold the cushion against undue lateral play and also against accidental upward movement and consequently preventing disconnection of the cushion with relation to the buttons carried by the supporting means.

Referring to Fig. 4, there is shown a cushion retainer resembling the retainer hereinbefore described save that the springs which engage the buttons on the support 14 are of different formation. For instance, each plate 15′ is of the same formation as the aforesaid plate 15 and is secured to the lower convolutions of the corresponding springs in the same manner as hereinbefore described. The plate 15′ has an opening 17′ for the same purpose as that for which the opening 17 is formed and arranged adjacent this opening 17′ I provide suitable fastening means for engagement with the button on the supporting means to retain the cushion in proper position as hereinbefore explained. In this modified form the fastening means may be formed from a resilient piece of material or other suitable material bent preferably into substantially U-shape, including arms 21 and a bight portion 22. This fastening means may be mounted in any suitable manner but is preferably secured to the plate 15′ by forming coils 23 at the juncture of the bight portion 22 with the inner ends of the arms 21. Through these coils suitable fasteners 23 are passed to secure said fastening means 21—22 to the plate 15′.

From the foregoing it will be seen that I provide a simple, inexpensive, durable and efficient cushion seat retainer embodying means for positively retaining the seat in operative position on its support against sliding play. It may be noted further that on small cushions, that is, cushions of the size to take or receive a single passenger, the cushion need be provided with but one of my improved retainers to prevent the cushion from sliding forwardly off of its support. It is obvious that the retainers on a long cushion, where two are used, may be positioned at the extreme forward corners instead of as shown, if desired.

What is claimed:

1. The combination of a spring structure embodying a frame, springs mounted on the frame and a support for the structure, of a plate having fingers adapted to engage a lower convolution of one of the springs and provided with a central opening, spring arms carried by the plate and projecting over the opening, and a button secured to the support and adapted to pass through the opening of the plate and yieldably engaged by said spring arms.

2. The combination of a spring structure, a plate provided with fingers adapted to be secured to the lower convolution of one of the springs of the structure whereby the plate is carried by the structure, the plate having a central opening, and spring arms secured to the plate and arranged within the convolutions of the corresponding spring.

3. The combination of a spring structure and the support on which the structure rests, a plate provided with fingers adapted to be secured to the lower convolution of one of the springs of the structure, said plate having a central opening, a button secured to said support and adapted to project through the opening in said plate, and means carried by the plate and arranged within the spring to operatively engage the button and hold the spring structure against sliding movement off of said support.

4. The combination of a spring structure and the support on which the spring structure rests, plates provided with fingers adapted to embrace the lower convolutions of two of the springs of the structure whereby the plates are carried by the structure, each plate having an opening, spaced buttons secured to said support and adapted to project through the openings in said plates, and spring arms secured to each plate and arranged to operatively connect with the corresponding buttons to fasten and retain the structure on the support against sliding movement off of the latter.

5. The combination of a cushion and the support upon which the cushion rests, plates carried by the cushion and provided with central openings, buttons on the support adapted to project through the openings of said plates, and spring arms carried by the plates and adapted to operatively connect with said buttons to fasten and retain the cushion on the support against sliding movement off of the support.

6. The combination of a spring structure, an apertured member secured to the spring structure to receive a projection through its aperture, and spring arms arranged adjacent the aperture of said plate to engage the projection passed through the aperture and thereby retain the cushion in relatively fixed position.

7. The combination of a cushion for vehicles, an apertured member carried by the cushion to receive a projection through its aperture, and fastening means arranged adjacent the aperture of said apertured member to engage a projection passed through said apertured member so as to retain the cushion in relatively fixed position.

In testimony whereof I affix my signature in presence of two witnesses.

WATSON R. SMITH.

Witnesses:
RALPH L. WILCOX,
ETHEL M. PHELAN.